United States Patent
Champilou et al.

[11] Patent Number: 6,105,647
[45] Date of Patent: Aug. 22, 2000

[54] RADIAL TIRE WITH AN OBLIQUELY LAP-WELDED CARCASS PLY

[75] Inventors: Yves Champilou, Clermont-Ferrand; Bruno Panighel, Aulnat, both of France

[73] Assignee: Michelin Recherche et Technique, S.A., Granges-Paccot, Switzerland

[21] Appl. No.: 09/068,429
[22] PCT Filed: Nov. 6, 1996
[86] PCT No.: PCT/EP96/04855
§ 371 Date: Sep. 21, 1998
§ 102(e) Date: Sep. 21, 1998
[87] PCT Pub. No.: WO97/17216
PCT Pub. Date: May 15, 1997

[30] Foreign Application Priority Data
Nov. 10, 1995 [FR] France ................................. 95 13445

[51] Int. Cl.⁷ ................................. B60C 9/08; B60C 9/11
[52] U.S. Cl. ................................. 152/560; 152/548; 152/563; 156/134
[58] Field of Search ................................. 152/548, 558, 152/560, 563; 156/134

[56] References Cited

U.S. PATENT DOCUMENTS 2,688,996  9/1954  Loomis .
4,325,423  4/1982  Seitz et al. .

FOREIGN PATENT DOCUMENTS 1269753  7/1961  France .
12879    7/1911  United Kingdom .
25172    11/1913 United Kingdom .

*Primary Examiner*—Adrienne C. Johnstone
*Attorney, Agent, or Firm*—Baker Botts L.L.P.

[57] ABSTRACT

A radial tire having at least one side wall and a carcass reinforcement consisting of at least one ply (20) reinforced by parallel threads (24) in substantially radial direction, termed radial threads, and having at least one lap weld (21) formed by superposition of two ends (22, 23) or adjacent elements of said ply, characterized in that, in the side wall, the general orientation (D2) of the lap weld is oblique with respect to the direction (D1) of the radial threads (24). The radial tire for a passenger vehicle or van, has a carcass reinforcement which includes a single radial ply, the radial threads (24) having in particular a polyester, particularly polyethylene terephthalate base. The tire according to the invention, compared to prior art radial tires, presents an improved outward appearance of the side walls.

12 Claims, 4 Drawing Sheets

RADIAL TIRE WITH AN OBLIQUELY LAP-WELDED CARCASS PLY

BACKGROUND OF THE INVENTION

This invention relates to radial tires and to reinforcements serving to reinforce the carcass of such tires.

Such carcass reinforcements are known to consist of at least one ply, hereinafter referred to as 'radial ply' or 'radial carcass ply,' prepared in the form of a semifinished product and consisting essentially of an elastomer matrix reinforced with threads. These reinforcing threads, hereinafter referred to as 'radial threads,' are arranged at regular intervals, parallel to each other, in a substantially radial direction (substantially perpendicular, that is, to the circumferential direction), that is to say conventionally a direction making an angle of about 90°±10° with the tangent to the circumferential direction of the tire.

Each radial ply normally takes the form of a continuous annular element formed, in fabrication of the carcass reinforcement on a drum, by cutting fabric strips or widths, then assembling the two edges of the cut on the drum by a joint, also known as a 'weld,' to connect the two edges. According to the rules of the prior art these fabric strips are always cut between two radial threads and parallel to them, so as not to cut them. Hence the weld thus obtained has an orientation that may be called radial, like that of the reinforcing threads.

Two types of joints or welds are currently in use: the so-called 'butt' weld, made by butting the two ends (that is, without superposition of the two edges), and the so-called 'lap' weld (that is, with superposition, overlapping, of the two edges). In the case of a radial tire carcass for passenger cars or vans, with carcass reinforced by non-metallic threads, in particular textile threads, a lap weld is ordinarily used.

This invention refers specifically to an improvement made in the lap welds of radial plies forming the carcass reinforcements of radial tires.

As the name implies, the technique of lap welding consists in covering one edge of a ply with the other edge, maintaining a certain distance, and forming the bond by applying pressure. After curing of the tire, this type of weld offers great solidity, due to the larger surface area of adhesion available between the overlapping parts.

However, this lap weld has some disadvantages. Because of a double thickness of fabric, the density of radial threads is in effect multiplied by two in the lapped area. By 'thread density' is meant, in known manner, the number of threads per unit length of ply, in a direction perpendicular to the axes of the threads. The presence of these 'double' threads (double layer of threads) has the result in particular that under the action of the tire inflation pressure, and hence the application of tension to the radial carcass ply, each radial thread present in the weld will undergo about two times less tension and elongation compared to a radial thread located outside of the weld. Furthermore, in known manner, the radial threads, if subject to thermal shrinkage, will show a different contraction upon curing of the tire according to whether they are inside or outside of the weld.

The above phenomena result in a discontinuity of the properties of the carcass ply at the weld, in particular of the rigidity, and consequently a lack of uniformity in the manufactured tire. This discontinuity and lack of uniformity, greatly localized, may be especially damaging to the appearance, the outward aspect, of the tire, since it generally manifests itself by producing a more or less pronounced hollow in the side walls of the inflated tire. As is known, this depression or deformation of the side walls, described also by the term "indentation," is generally more pronounced, the smaller the modulus of elasticity of the reinforcing thread.

The above fault in appearance, well known and especially visible when for example polyester threads are used, is sometimes disadvantageous to the successful marketing of the tire; if this flaw is too pronounced, it may even make the manufactured tire unmarketable, so that it will be destroyed, which is the more regrettable because this flaw in appearance does not affect safety. Besides, it is known that this non-uniformity of the side walls may impair the smooth of running of the tire.

A great many solutions have been proposed heretofore in an attempt to mitigate the foregoing disadvantages. In the vast majority of cases, these solutions consist in modifying the properties of the radial reinforcing threads or their arrangement in the lapped portion in question.

For example, it has been suggested that use be made of radial threads having different properties, for example threads made of materials of smaller modulus, more intensely twisted threads, or having a smaller thermal contraction, a lower strength, diameter and/or titer (see for example Patent Application FR A 2,624,441, Patents EP B 0,205,824, JP 1988/48723); other solutions that have been suggested consist in increasing the spacing between the threads, in removing the 'duplicate' threads after the welding operation, or eliminating them prior to the welding operation (see for example patent applications published under Nos. JP 1991/189131, JP 1993/154938, JP 1993/238203, JP 1993/246207). It has also been suggested that the thickness of the weld may be reduced by methods of crushing or homogenizing the lapped area (see for example EP A 0,406,821 or U.S. Pat. No. 5,021,115, EP A 0,498,215, U.S. Pat. No. 5,240,534), or adding another strip of ply or rubber over the weld (see for example EP A 0,407,134 or U.S. Pat. No. 5,437,751).

All of the solutions cited have the major disadvantage of requiring either the preparation of hybrid calendered fabrics, non-homogeneous that is (use, for example, of radial threads of different kinds and/or properties, different thread densities), prior to the manufacturing operations of tire, or additional steps during said manufacture.

Other solutions have been proposed, fewer in number, that consist in selectively cutting some of the 'duplicate' radial threads in one or the other lapped edge of the weld. Thus, only the threads of one of the two edges 'participate' in tensing the carcass ply. By way of example, U.S. Pat. No. 4,466,473 describes a process of radial carcass reinforcement manufacture that consists in making incisions, in one of the ply edges, perpendicular to the direction of the radial threads, this edge being then covered with the other edge to form the lap weld. Such methods of incision of fabrics by selective cutting of the radial threads of one of the two edges are especially difficult to handle; in the first place, the cutting must be deep enough so that all the 'duplicate' threads are cut, but secondly it is imperative, for reasons of safety, that none of the threads outside of the weld be cut. Such conditions necessitate frequent manual interventions or corrections by an operator, on the fabrication drum, and finally these methods are not compatible with the use of automatic fabricating machines, operating at high speed, and not affording the precision essential to execution of such incisions and welds.

Finally, the many solutions heretofore proposed prove costly or difficult to implement industrially, and none of them has been found entirely satisfactory, especially in terms of productivity, to eliminate or even mitigate the problem of side wall deformation of radial tires, in particular, tires reinforced with polyester threads having a low modulus of elasticity.

Thus there is still a need, and a growing need, for improvement in the appearance of the side walls of radial tires.

SUMMARY OF THE INVENTION

One object of this invention is to propose an improved tire respecting appearance of the side walls, without sacrificing performance.

Another object of the invention is to provide such a tire without difficulty or excessive cost of manufacture, such a tire being in particular producible on automatic machines operating at high speed, without need for manual intervention and hence without loss of productivity.

The radial tire of the invention, having at least one side wall and a carcass reinforcement consisting of at least one radial ply comprising at least one lap weld formed by superposition of two ends or two adjacent elements of said ply, is characterized in that, at least in the said side wall, the general orientation (hereafter D2) of the lap weld is oblique with respect to the direction (hereafter D1) of the radial threads, i.e. neither parallel nor perpendicular to said direction D1.

In other words, the tire carcass reinforcement of the invention is made up of at least one annular fabric element (radial ply) lap-welded, or with ends or adjacent portions of said ply overlapping, the lap weld thus obtained, in at least one side wall of the tire, assuming a general orientation inclined to that of the radial threads, and not parallel to the latter as is the case in radial tires of the prior art. This lap weld may be termed an 'oblique' weld, in contradistinction to the conventional welds of the prior art, called 'radial,' whose orientation is parallel to the direction D1 of the radial threads.

Surprisingly enough, it has been found that the trace of the weld in the side wall of the tire is definitely less apparent in this arrangement than in the conventional arrangement. Besides, a general improvement in uniformity is achieved, for reasons about to be given.

The invention relates in particular to a tire whose carcass reinforcement comprises a single radial ply.

The invention will be readily understood with the aid of the description and examples to follow, as well as the figures, all schematic, relating to said examples.

DESCRIPTION OF PREFERRED EMBODIMENTS

Figure 1:
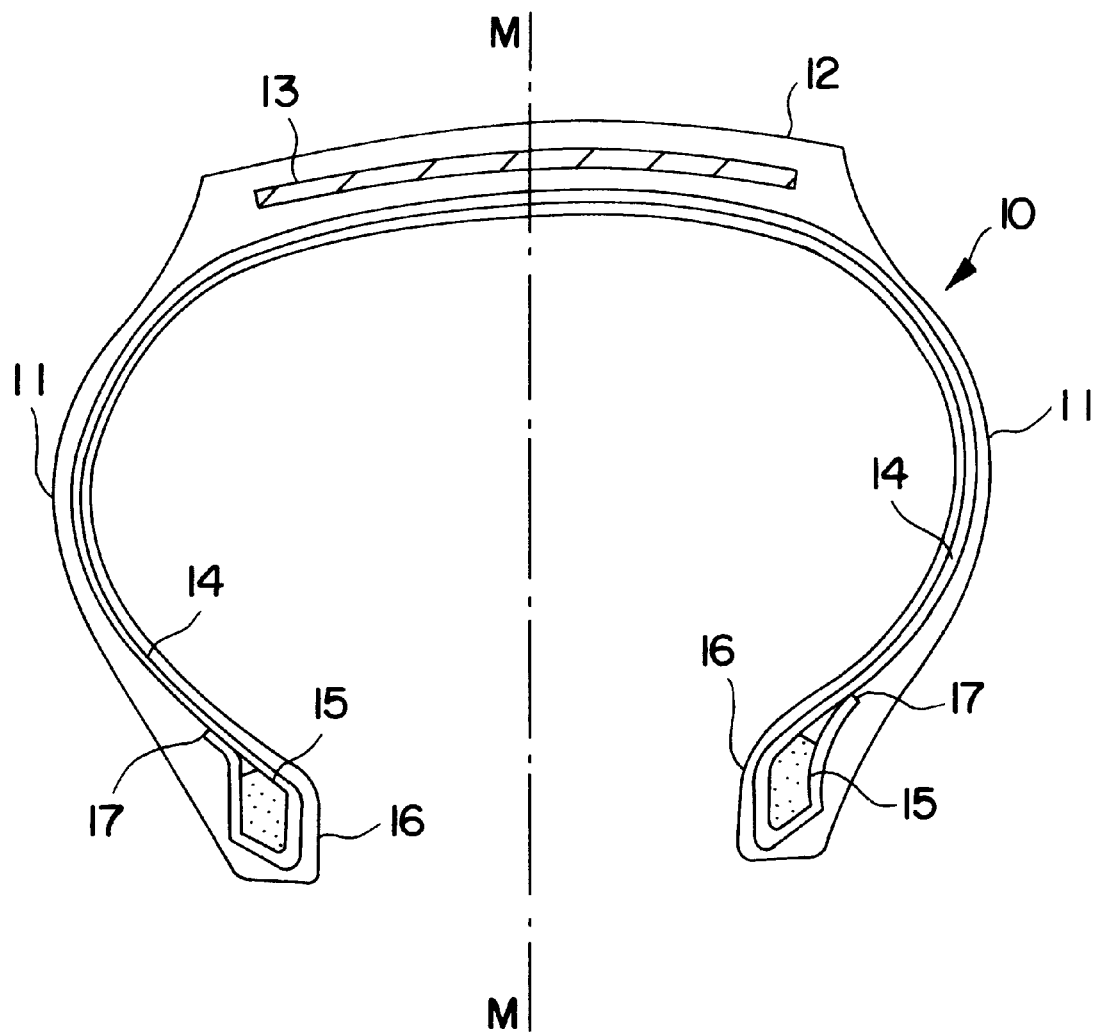
FIG. 1 shows a radial section of a tire with radial carcass reinforcement.

FIG. 1, schematically and in a very general way, shows a radial section of a tire with radial carcass reinforcement for a passenger vehicle or van, said tire being according to the invention or not. In this general representation, said tire 10 has two side walls 11 joined by a tread 12, a belt reinforcement 13, and a carcass reinforcement 14 anchored to two bead cores 15 in either bead 16, as far as the two side ends 17 of said carcass reinforcement 14.

The carcass reinforcement 14 consists of at least one radial ply containing radial reinforcing threads arranged practically parallel to each other and extending from bead to bead so as to make an angle between 80° and 90° with the median circumferential plane M—M. By 'median circumferential plane' is meant, in known manner, the plane perpendicular to the axis of rotation of the tire, located halfway between the two bead cores 15.

Figure 2A:
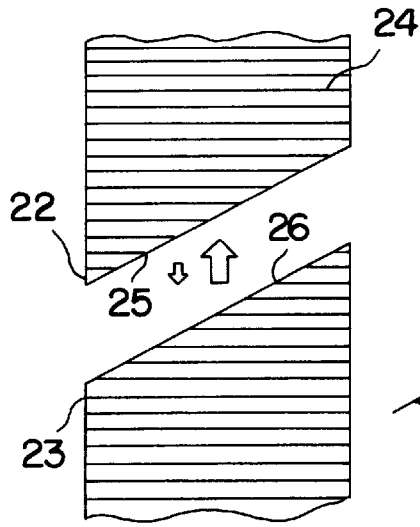
FIG. 2, in top view and flat projection, for a tire according to the invention, shows a portion of radial carcass ply with an oblique lap weld (FIG. 2b), as well as the two ends (FIG. 2a) of the same fabric strip, cut on the bias relative to the radial threads, and intended to be superimposed to obtain the oblique lap weld.
Figure 2B:
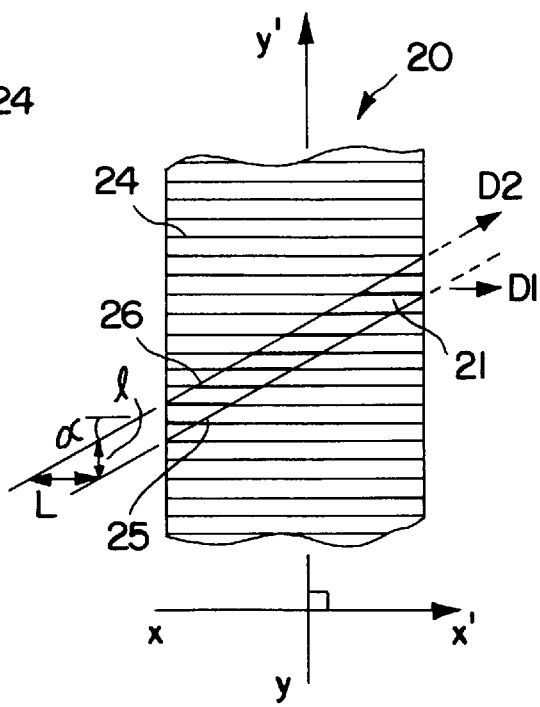

FIG. 2, in top view, for a tire 10 according to the invention, shows a portion of radial carcass ply 20 with an oblique lap weld 21 (FIG. 2b), and the two ends 22 and 23, cut on the bias, of one fabric strip (FIG. 2a), said two ends being, intended for superimposition to form the weld 21. This portion of ply 20 is part of the carcass reinforcement 14, located in the side wall 11 of a tire 10 according to the invention.

To facilitate the description and understanding of the invention, this portion of ply 20 and its oblique lap weld 21 are shown schematically, projected flat, and not in the toroidal form assumed by the shaped envelope. This ply 20 is reinforced by radial threads 24 arranged at regular intervals, for example about 1 mm, and substantially parallel to each other. By way of example, these radial threads are polyester cords, in particular polyethylene terephthalate (PET), having for example a titer of about 400 to 500 tex (400 to 500 grams weight per thousand meters of cord).

The direction D1 of these radial threads 24 is substantially radial, i.e. substantially parallel to the direction of the strictly radial axis xx', which is to say that the direction D1 makes an angle of 0°±10° with the axis xx', itself perpendicular to the circumferential axis yy' (axis tangent to the circumferential direction). The axis yy' is any circumferential axis passing through the side wall 11 of the tire and parallel to the median circumferential axis (axis contained in the median circumferential plane M—M).

In cases where the direction D1 does not coincide with the strictly radial direction xx', the lap weld of the tire according to the invention is preferably oblique both with respect to the direction of the radial threads and with respect to the direction xx'.

During fabrication of the tire according to the invention on a drum, prior to the operation of shaping the envelope, the ply 20 consists of an annular element continuous in a direction perpendicular to D1, that is, substantially parallel to the direction yy', said continuous element being formed by overlapping and assembling of the two ends 22 and 23 of the same fabric strip. These two ends 22 and 23 are cut on the bias with respect to the axis (direction D1) of the radial threads 24 and are shown in FIG. 2a just prior to the circumferential overlapping (in the circumferential direction yy' indicated by the two arrows) of the selvage 25 with the selvage 26, to form the oblique lap weld 21 of orientation D2.

Generally, in this description, 'lap weld' is understood to mean the entire zone of overlapping of the two ends or adjacent elements of the fabric forming the radial ply, as for example the two ends 22 and 23 in FIG. 2a, this area of overlap being bounded circumferentially by its two selvages (25 and 26 in FIG. 2b).

As shown clearly in FIG. 2b the weld 21 has a general orientation D2 oblique with respect to the direction D1 of the radial threads. In the area of overlap, the density of radial threads is doubled relative to the rest of the welded ply, this double density being illustrated schematically by heavier lines. By way of example, the radial thread density may be on the order of 100 threads per decimeter of ply outside of the weld and hence about 200 threads/dm inside the weld.

The acute angle α made by the general orientation D2 of the oblique weld with the direction D1 of the radial threads will henceforth be called the "weld angle". By oblique weld is meant here, by convention, a weld inclined by more that 1 degree with respect to the reference direction (a greater than 1 degree).

This weld angle α may vary from more than 1 degree to more than tens of degrees, for example, up to 20 degrees or more, depending on the particular characteristics of the manufactured tire, and especially on the dimensions of the radial ply or those of the side walls of the tire. Preferably, the angle α is chosen over 2°, more preferably still in a range from 5° to 20°, yet more preferably in a range from 10° to 15°.

By convention, the dimension of the weld (selvage to selvage) in a direction perpendicular to D1 (i.e. in substantially circumferential direction) is called the circumferential weld width l, and the dimension of the weld in a direction parallel to D1 is called the radial weld length L (see FIG. 2b).

Preferably, in a tire according to the invention, the dimension l is less than the dimension L, which is to say that the tangent of the angle α is less than 1 (α less than 45°).

Figure 3A:
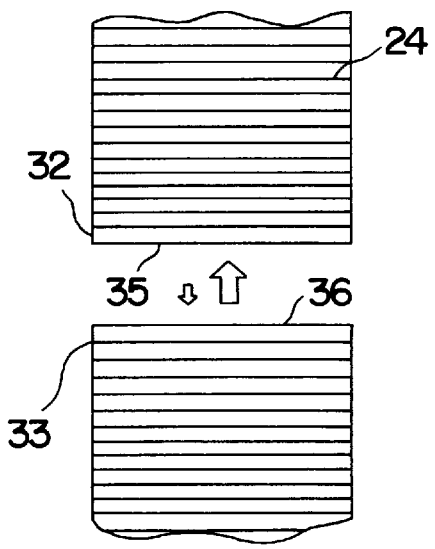
FIG. 3, in top view and flat projection, for a tire according to the prior art, shows a portion of radial carcass ply with a radial weld (FIG. 3b) and the two ends (FIG. 3a) of one fabric strip, cut parallel to the radial threads and intended to be superimposed to produce the radial weld.
Figure 3B:
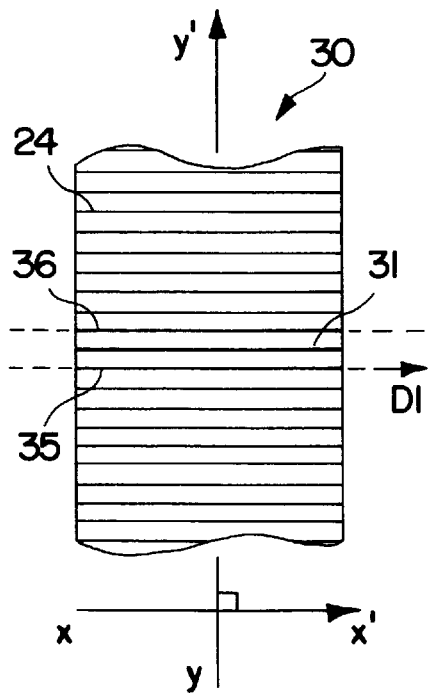

For comparison with FIG. 2, FIG. 3 pertains to a conventional envelope according to the prior art. This FIG. 3, in top view and projected flat, shows a portion of radial ply 30 located in the side wall of said conventional envelope. This portion of ply 30 comprises a lap weld 31 according to the prior art, radial that is (FIG. 3b). Likewise shown in FIG. 3 are the two ends 32 and 33 of one fabric strip of which said ply 30 (FIG. 3a) is made.

The ply 30, in manufacture of the tire on a drum, is made in a known manner by circumferential lapping of the two ends 32 and 33 of one fabric strip rectangular in shape. Said two ends 32 and 33 are always cut between two radial threads 24 and parallel to their direction D1, so as not to cut or damage the radial threads. After superposition of selvage 35 with selvage 36, a radial lap weld is obtained, that is, a weld whose general orientation is parallel to the direction D1 of the radial threads. In this radial weld, the density of radial threads is doubled relative to the rest of the ply, the double density being indicated in FIG. 3b by heavier lines, as in the preceding figure FIG. 2b. The weld 31 being parallel to the direction D1, the radial weld length L is simply equal, in the present case, to the total width of the radial ply measured along D1 between its two lateral ends 17.

Thus we have found that on the side wall of the tire according to the invention with an oblique lap-welded carcass ply, the trace of the weld is less conspicuous than on the side wall of a conventional prior art tire with a radially welded carcass ply. Besides, the undesirable effect of the weld being delocalized, as it were 'diluted,' over a greater circumferential length (compare FIGS. 2b and 3b), the tire of the invention shows a generally improved uniformity over the conventional tire.

To obtain this result, one must venture also to cut the reinforcing radial threads during the fabrication of the tire, which is altogether against the rules of the art. For according to the knowledge of the person skilled in the art, it is very important not to cut or even damage the radial threads while cutting fabric strips 'lengthwise' to make up the radial plies. And those skilled in the art did not imagine that such a cut could be made otherwise than parallel to the radial threads and between them.

The description of the invention as previously given with reference to FIG. 2 applies likewise to cases where the radial threads are not used alone to reinforce the fabrics, but in combination with other, non-radial threads. For example, the radial ply 20 may consist of a woven fabric comprising, in known manner, warp threads and weft threads, the warp threads being the radial threads 24 shown in FIG. 2, intersecting with weft threads not shown in FIG. 2, for example weft threads of polyester and/or cotton.

Figure 4A:
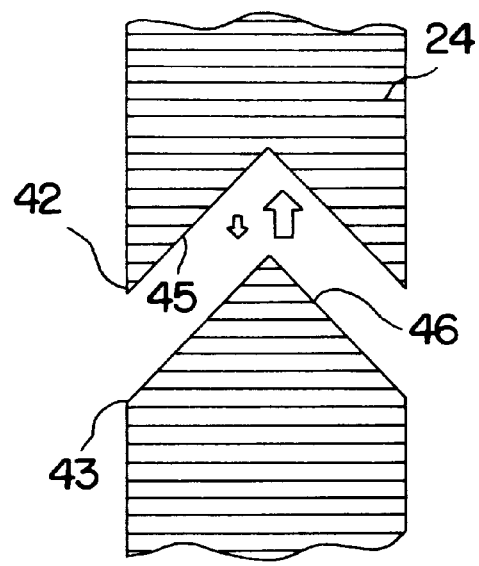
FIG. 4 shows another variant of a tire according to the invention, having a portion of radial carcass ply with a V-shaped oblique lap weld.
Figure 4B:
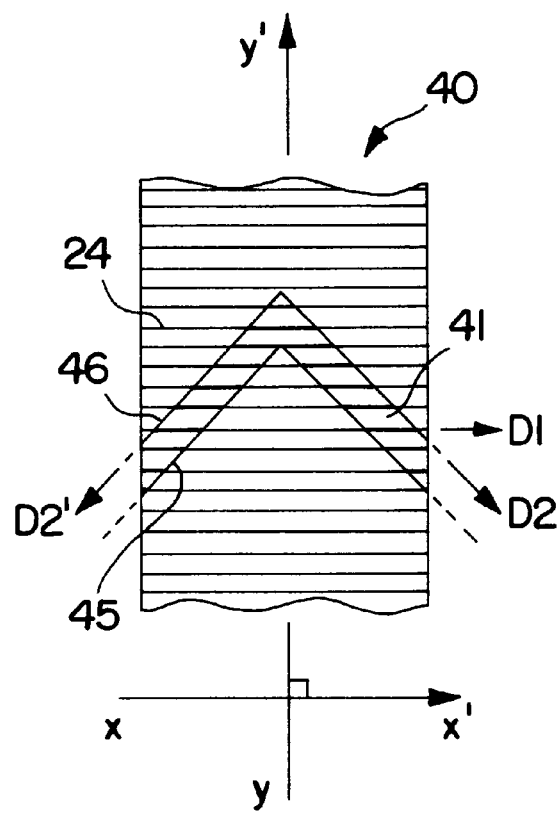

FIG. 4, compared with FIG. 2, schematizes another example of a tire according to the invention. Seen from above and projected flat, it shows a portion of radial carcass ply 40 (FIG. 4b) having a V-shaped oblique lap weld 41 substantially centered on the axis yy'. The axis yy' shown here is the median circumferential axis, which is to say that the vertex of the V is centered under the tread of the tire. FIG. 4 also shows the two ends 42 and 43 of one fabric strip prior to their circumferential overlapping (FIG. 4a). To produce the weld 41, the two ends 42 and 43 are previously cut on the bias, giving them their V shape. Thus a main weld is obtained consisting of two oblique elementary welds of different orientation D2 and D2', symmetrically inclined to the median circumferential plane M—M and extending either way from the latter into each side wall of the tire. In each elementary weld, as for the preceding figures, the radial thread density is double relative to the rest of the ply, this double density being indicated in FIG. 4b by heavier lines.

Figure 5:
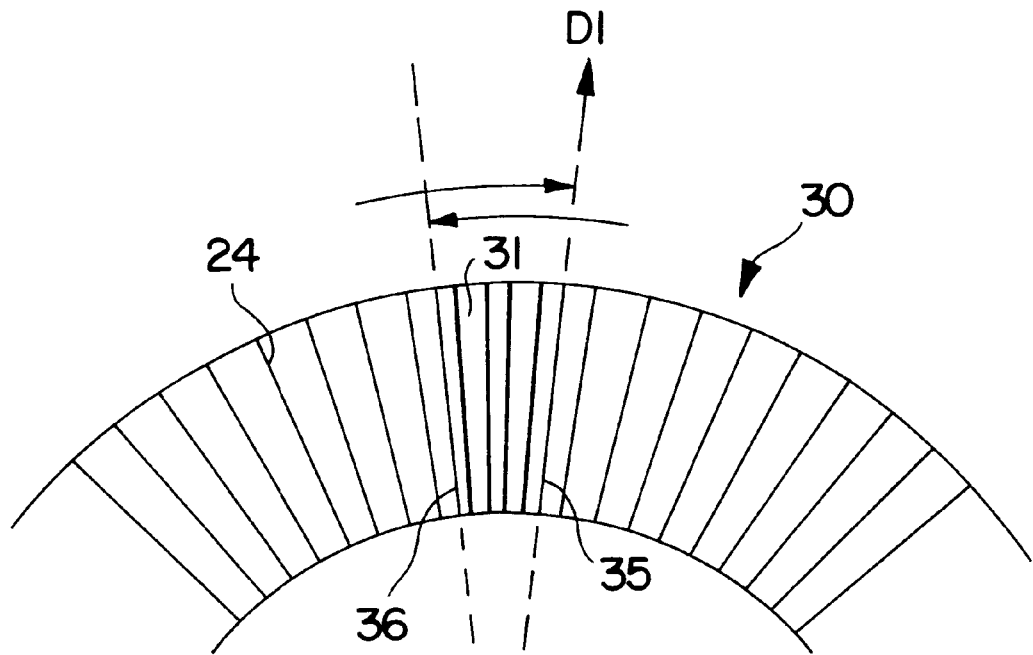
FIG. 5 is a view in longitudinal section of a portion of radial carcass reinforcement for a radial tire according to the prior art.

FIG. 5, for its part, shows another possible graphic illustration of a portion of radial according to the prior art. This FIG. 5 is a longitudinal section of a portion of conventional, radial ply 30 as represented for example in FIG. 3b, this portion of ply having assumed in FIG. 5 the toroidal shape it will have once the has been formed. This ply 30, reinforced by radial threads 24, is characterized in known manner by a weld 31 bounded by two selvages 35 and 36 whose general orientation is radial, that is, parallel to the direction D1 of the radial threads adjacent to the weld.

Figure 6:
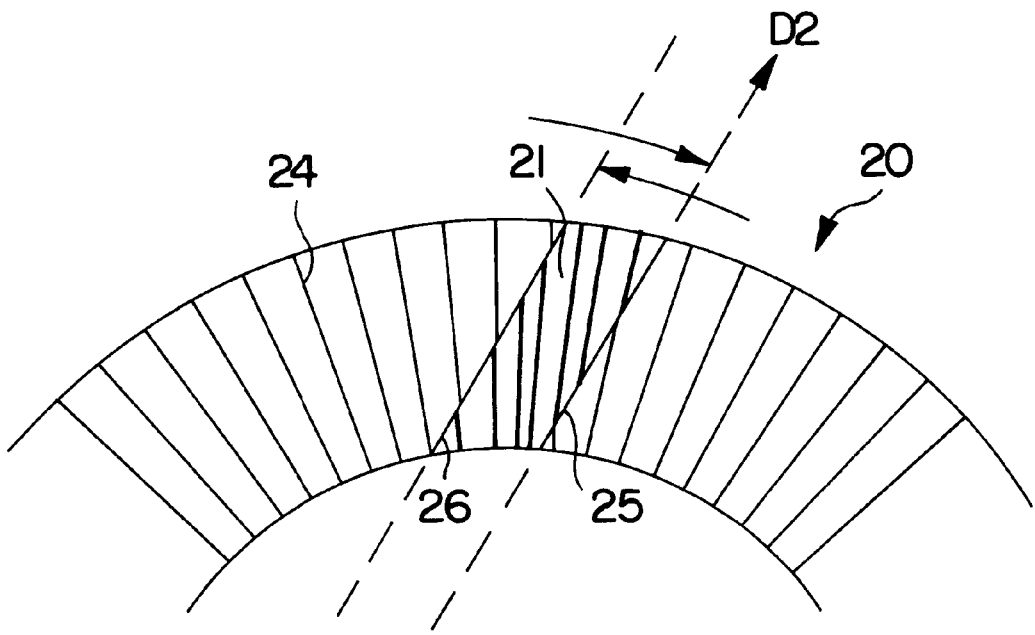
FIG. 6 is a view in longitudinal section of a portion of radial carcass reinforcement for a radial tire according to the invention.

For comparison with FIG. 5, FIG. 6 is a longitudinal section of a portion of the radial carcass ply 20 as shown in FIG. 2b, likewise in the toroidal form assumed by the shaped in the case of a tire according to the invention. This ply 20, reinforced by radial threads 24, is characterized by a lap weld 21 bounded by the two selvages 25 and 26 whose general orientation D2 is oblique with respect to the direction D1 of the radial threads in the area of the weld.

Of course, in all of the FIGS. 1 to 6 preceding, the true proportions among the inclination and dimensions of the weld, the dimensions of the tire or its radial ply, those of the radial threads or intervals between the threads, and in general any other parameter, could not be shown, with a view to simplification and clarity of exposition.

According to the invention, the oblique lap weld is small in circumferential direction (preferably less than 50 mm) relative to the dimensions of the radial ply itself. The dimension l of the weld may for example range from 2 mm to some tens of millimeters, for example up to 20 or 30 mm, depending on the particular characteristics of the manufactured tire. Preferably the dimension l is greater than 2 mm, more preferably over 3 mm, in particular between 3 and 15 mm.

It has been found in rolling tests on tires of the invention for passenger cars or vans for which the weld angle α was in a range from 5° to 20°, that a weld dimension l over 5 mm, preferably over 8 mm, should be preferred for reasons of endurance when the rolling conditions are especially severe.

Considering especially the preferred values indicated above for their dimension l and angle α, the oblique lap welds in radial plies of tires according to the invention generally comprise cut radial threads only, that is, in principle (but this is not obligatory) they do not comprise any whole radial thread; by 'whole radial thread' is here meant a radial thread extending continuously from one end 17 to the other end 17 of the carcass reinforcement 14.

It is known that in prior art tires, each radial thread 24 forms a continuous reinforcing bow extending throughout the width of the tire, rolled up in each bead 16, over each of the two bead cores 15, as far as the two lateral extremities 17 of the carcass reinforcement 14 (FIG. 1).

One consequence of the present invention is that by reason of the inclination of the oblique weld, this continuity of reinforcing bows is interrupted at the weld; the radial weld length L will thus preferably be chosen so that the strength of the ply at the weld, measured along D1 after curing of the tire, will be at least equal to the strength of the ply outside the weld. Preferably the radial weld length L will thus be chosen over 30 mm, more preferably over 40 mm.

For the other design parameters of the tire according to the invention, not directly involving the form and dimensions of the weld, the known rules may be followed. Specifically, the radial thread density is generally between some tens and some hundreds of threads per decimeter, for example between 50 and 250 threads/dm, in particular between 80 and 145 threads/dm, corresponding to an interval between radial threads ranging from some tenths of millimeters to some millimeters, for example between 0.4 and 2.0 mm, in particular between 0.7 and 1.25 mm.

The preferred values indicated above (angles, dimensions of weld, thread densities) are all measured in one plane when the radial ply and its oblique lap weld are projected flat.

Consequently, the invention relates to any radial tire comprising, in at least one side wall, an oblique lap weld, that is, a lap weld whose orientation or general direction D2 is oblique with respect to the direction D1 of the radial threads.

The above definition applies to any weld traversing the side wall, whatever the particular shape of the weld or of its selvages, and this definition extends to any elementary weld segment constituting part of a principal weld.

Indeed the invention could be realized with a principal weld consisting, in the same side wall, of several elementary segments or portions of different orientations, oblique or not oblique. In such a case, preferably at least a substantial length of the principal weld will show, across the side wall, a general orientation oblique to the direction D1.

Preferably the oblique lap weld will have an oblique orientation in the entire side wall of the tire, more preferably a continuous oblique orientation (no discontinuity of orientation). Advantageously, the oblique lap weld may be a rectilinear weld, which is to say that the general direction D2 of the weld, when projected flat, will make a continuous straight line throughout the side wall of the tire. But the oblique lap weld so projected may likewise take a non-rectilinear trajectory, for example a curved line, such as a circular arc for example.

The two selvages bounding the weld in circumferential direction may be parallel or not parallel to each other. Preferably, the two selvages will be geometrically superposable. By this is meant parallel and identical selvages, having the same, geometrical shape and the same contours. Thus the operation of cutting the fabric strips on a drum when making the tire will be the same for both selvages, and may therefore be executed by the same tool at a high speed.

It is not necessary, in practicing the invention, that the two selvages of the oblique lap weld, across the side wall of the tire, be locally and constantly parallel to the general direction or orientation D2 of the weld. Without altering the spirit of the invention, the two selvages, or either of them alone, might for example have a more or less irregular shape, such as an undulated, a crenelated, a zigzag or even a sawtooth shape.

Preferably, the two selvages will be parallel to the weld itself, that is, to the axis D2 determining their general oblique orientation, as shown by way of example in FIGS. 2b and 4b.

According to the invention, in the usual case of a tire having two side walls, the lap weld located in the second side wall may have the same orientation as the oblique lap weld of the first side wall, or a different orientation. The weld of the second side wall (the one not in sight after the tire has been mounted on a vehicle) might for example be simply radial. Preferably, the weld of the second side wall will itself have an oblique orientation.

Preferably, in the case of a tire according to the invention having two side walls and an oblique lap weld in each, the two oblique welds will have the same inclination, meaning that they will form either an angle of the same magnitude and the same sign or an angle of the same magnitude and the opposite sign with respect to the direction D1 of the radial threads. Each oblique weld will preferably have a continuous orientation D2 over at least each half-width of ply, that is, from one lateral end of the carcass ply 17 to the median circumferential plane M—M; thus the operation of cutting the fabric strips will be facilitated and may be executed by knives of simple shape. Advantageously, a single oblique lap weld of continuous, in particular rectilinear, orientation D2 will traverse the tire completely from one lateral end 17 of the radial ply to its other lateral end 17, passing from one side wall 11 to the other side wall 11 (FIG. 1).

According to the invention, the lap weld of the radial ply is oblique in at least one side wall of the tire, where the orientation of the weld may be oblique or not in the rest of the tire. Preferably, the orientation will be taken oblique in at least each side wall of the tire, preferably the same inclination in each side wall.

COMPARATIVE EXAMPLES

Four lots of passenger car tires, size 185/80-14, were made, one control lot corresponding to the prior art (Lot T), the other three according to the invention (Lots A, B, C), each lot comprising six different tires. As shown in FIG. 1, the tires of each lot had two side walls 11 joined by a tread 12, a belt reinforcement 13, a carcass reinforcement 14 anchored to two bead cores 15 in the beads 16 as far as the two lateral extremities 17 of said carcass 14.

The belt reinforcement 13 comprised, in conventional manner, two superposed plies reinforced by substantially parallel metallic cables inclined about 22 degrees relative to the median circumferential plane, said plies being crossed in relation to the said plane.

The carcass reinforcement 14 consists of a single radial ply of woven fabric whose weft threads are polyester/cotton elastic threads and whose radial warp threads are of PET (so-called "HMLS" PET of high modulus and low contraction). These radial threads are known cords ("plied yarns, or "fabric threads") of formula 110×2×2 (tex) 350Z/ 350S, meaning that each cord is made up of four spun yarns (multifilament fibers) whose individual titer is equal to 110 tex before twisting, twisted by twos at 350 turns per meter in one direction (direction Z) in a first stage, then twisted all four together (two pairs) in the opposite direction (direction S) at 350 turns per meter in a second stage. The radial thread density, outside of the weld, was 98 threads per decimeter of radial ply, so that the mean distance between two adjacent radial threads, centerline to centerline, was 1.02 millimeters.

This radial ply comprised a lap weld whose dimension l was 8.2 mm, and which contained 8 radial threads in each lapping edge. The total width of the radial ply, measured along D1 between its two lateral extremities 17, was about 580 mm.

The following characteristics were likewise common to all the tires tested (Lots A, B, C and T): the direction D1 of the radial threads coincided with the strictly radial direction xx', the lap weld had a continuous and rectilinear general orientation D2 throughout the width of the radial ply, and the weld was bounded by two simple selvages, parallel and themselves rectilinear.

The presence of an oblique lap weld (weld angle α over 1°) was the only characteristic distinguishing the tires according to the invention (Lot A, α=5°; Lot B, α=10°; Lot C, α=15°) from those of the control lot (radial weld, α=0°); on the tires according to the invention, the radial weld length L was always greater than 30 mm.

Each tire was mounted on a rim and inflated to 3.5 bars, then inspected for concave side wall deformation due to the lap weld, in the following manner:

Firstly, by measuring in known manner, using a mechanical feeler mounted on an automatic inspection machine, the depth of concavity in two locations on the side wall, at mid side wall, and at the shoulder (side wall area near the tread);

Secondly, by subjecting the tire to visual inspection, with qualitative evaluation by five different observers who, under like conditions of examination, assigned to each a rating as follows (after standardizing on controls):

1: excellent appearance of side wall (no trace of weld visible to the naked eye)
2: good appearance of side wall (trace faintly visible to the naked eye)
3: poor appearance of sidewall (trace highly visible to the naked eye) P After evaluation of all the tires, it was found firstly that whatever the lot analyzed, the mean depth of the concavities measured at mid side wall were substantially equal, namely about 0.31 mm (means calculated on the six envelopes of each lot).

Secondly, at the shoulder—area where concave deformation is most pronounced—the mean depth of the concavities was reduced by 15% in Lot A, and by 30–35% in Lots B and C, relative to the control lot (mean depth close to 1 mm in Lot T).

Last but not least, it was unexpectedly found that even for envelopes whose concave deformation (shoulder or mid side wall) are close in absolute value, the trace left by the weld is less conspicuous on the tires according to the invention (Lots A, B and C) than on the control tires (Lot T), regardless of observer; the best results were obtained for weld angles α equal to 10 degrees and 15 degrees (mean rating equal to 2 in both cases, compared to a mean rating of 2.8 on the control tires).

On other tires of the same size (185/80-14), it was found that this improvement in outward appearance of the side walls was observed even for weld angles as small as 2–2.5 degrees.

Again, the tires of Lots A, B and C were subjected to long-term machine rolling tests to assess their endurance; after several tens of thousands of kilometers, it was found that the endurance was equivalent to that of the control tires of Lot T.

Consequently, the tires according to the invention, compared to prior art tires, were improved in side wall appearance thanks to the presence of oblique lap welds in the radial plies forming their carcass reinforcement, without affecting their endurance properties.

The advantages of the invention are many.

The characteristics of the radial threads, their nature, their arrangement, may be the same inside and outside of the weld, in particular at each of its two selvages; thus no additional step in production is required, whether before, during or after the stage of fabrication.

The invention does not require any manual intervention during the stages of production, nor use of machinery of greater precision than the manufacturing machines commonly used for production of radial tires having conventional radial welds. The tires of the invention may in particular be made on automatic machines operating at high speed, hence without loss of productivity.

Essentially, a single modification, minor and without excess cost, need be made in the production tool: an operation of inclining the knives used to cut the fabrics, which knives may retain blades of quite simple shape, such as rectilinear blades for example.

Of course, the invention is not limited to what has been previously described.

In particular, the invention is not limited to a radial tire for a passenger vehicle or van, nor to a tire having a single carcass ply or a single oblique lap weld in at least one side wall, but applies to cases in which use is made of more than one ply to make up the carcass reinforcement and/or more than one oblique lap weld per carcass ply.

It is known in particular that the fabric strips used to make up radial carcass plies are cut from longer fabric strips themselves comprising so-called "preparation" welds (on fabrics) in contradistinction to so-called "production" welds (on tire plies). For the manufacture of prior art radial tires, these preparation welds are radial (orientation parallel to that of the radial threads), like the production welds. On the contrary, to manufacture the tires of the invention, one may advantageously choose preparation welds themselves having an oblique orientation with respect to the direction of the radial threads, which means that all the lap welds of the radial ply will be oblique, whether these welds are preparation or production welds, in particular preparation welds having an orientation parallel to the production welds, so that the latter cannot intercept the preparation welds.

Nor is the invention limited to the use of carcass plies reinforced with threads having low-moduli of elasticity, like polyester threads, for example in particular PET threads. The radial threads might be other textile threads, for example such as textile threads based on polyamide (aromatic or non-aromatic), cellulose or other non-textile threads, for example, glass fibers or metal threads, or else hybrid threads made of different materials. As already mentioned, these radial threads can be used alone to reinforce the radial plies of tires according to the invention, or else combined with other threads, especially as warp threads in woven fabrics.

Incidentally, the term 'thread' is to be taken in a very general sense, meaning that each of the radial threads may consist for example of a single thread, cylindrical in shape or not, or an assemblage of several unit threads, forming for example a cable, a cord, a multifilament fiber twisted on itself, while each unit thread may in particular consist either of a single filament, for example a monofilament of large diameter, or of several filaments. This definition is valid regardless of the unit cross-section of the unit thread, the material, or the method of assembling in the case of assembled threads.

We claim:

1. A radial tire having a carcass reinforcement in a side wall having at least one radial ply reinforced by parallel threads arranged in substantially radial direction, comprising a lap weld formed by overlapping two ends of adjacent elements of a ply, characterized in that, in the said side wall, the general orientation of the said lap weld is oblique with respect to the direction of the radial threads.

2. A tire according to claim 1, characterized in that the general orientation of the lap weld is oblique with respect to the strictly radial direction.

3. A tire according to claim 1, characterized in that the said oblique lap weld is bounded, in circumferential direction, by two geometrically superposable selvages.

4. A tire according to claim 1, characterized in that the weld angle $\alpha$ formed by the direction of the radial threads and the direction of the oblique lap weld is greater than 2 degrees.

5. A tire according to claim 1, characterized in that the dimension l of the oblique lap weld measured perpendicular to the direction of the radial threads is less than its dimension L measured parallel to the direction of said radial threads.

6. A tire according to claim 1, characterized in that the dimension l of the oblique lap weld measured perpendicular to the direction of the radial threads is greater than 2 millimeters.

7. A tire according to claim 6, for a passenger vehicle or van, characterized in that the dimension l is greater than 5 millimeters and in that the angle $\alpha$ is in a range from 5° to 20°.

8. A tire according to claim 7, characterized in that the dimension l is greater than 8 millimeters and in that the angle $\alpha$ is in a range from 10° to 15°.

9. A tire according to claim 1, characterized in that the dimension L of said oblique lap weld measured parallel to the direction of said radial threads is greater than 30 millimeters.

10. A tire according to claim 1, characterized in that the carcass reinforcement consists of a single radial ply.

11. A tire according to claim 1, characterized in that the radial threads are the warp threads of a woven fabric.

12. A tire according to claim 1, characterized in that the radial threads are polyester cords.

* * * * *

UNITED STATES PATENT AND TRADEMARK OFFICE
CERTIFICATE OF CORRECTION

PATENT NO. : 6,105,647
DATED : August 22, 2000
INVENTOR(S) : Champilou et al.

It is certified that error appears in the above-identified patent and that said Letters Patent is hereby corrected as shown below:

Column 6, line 51: "radial" should read -- radial carcass reinforcement --
Column 6, line 55: "the has" should read --the envelope has—
Column 6, line 62: "the shaped" should read --the shaped envelope--
Column 9, line 63: "P" should be deleted; and "After" should read -- ¶After --

Signed and Sealed this

Twenty-second Day of May, 2001

*Attest:*

NICHOLAS P. GODICI

*Attesting Officer*  *Acting Director of the United States Patent and Trademark Office*